United States Patent [19]
Murphy

[11] Patent Number: 6,062,842
[45] Date of Patent: May 16, 2000

[54] MOLD FOR USE IN A GAS-ASSISTED INJECTION MOLDING SYSTEM AND RUNNER SHUT-OFF SUBSYSTEM FOR USE THEREIN

[75] Inventor: John F. Murphy, Imlay City, Mich.

[73] Assignee: Larry J. Winget, Leonard, Mich.

[21] Appl. No.: 09/060,240

[22] Filed: Apr. 14, 1998

[51] Int. Cl.[7] .............................. B29C 45/00; B29C 45/40
[52] U.S. Cl. .......................... 425/130; 264/572; 425/444; 425/556; 425/577
[58] Field of Search ........................... 264/572; 425/130, 425/546, 577, 444, 812, 556

[56] References Cited

U.S. PATENT DOCUMENTS

| | | | |
|---|---|---|---|
| 4,106,887 | 8/1978 | Yasuike et al. | 264/572 |
| 4,682,943 | 7/1987 | Schomblond | 425/130 |
| 4,734,027 | 3/1988 | Adams | 425/556 |
| 4,740,150 | 4/1988 | Sayer | 264/572 |
| 4,942,006 | 7/1990 | Loren | 425/546 |
| 4,943,407 | 7/1990 | Hendry | 264/572 |
| 5,080,570 | 1/1992 | Baxi et al. | 425/130 |
| 5,090,886 | 2/1992 | Jaroschek | 425/130 |
| 5,098,637 | 3/1992 | Hendry | 264/572 |
| 5,149,546 | 9/1992 | Nelson | 425/130 |
| 5,204,127 | 4/1993 | Prusha | 425/577 |
| 5,232,711 | 8/1993 | Hendry | 425/130 |
| 5,336,072 | 8/1994 | Auer | 425/130 |
| 5,423,667 | 6/1995 | Jaroschek | 425/130 |
| 5,492,658 | 2/1996 | Ohno et al. | 425/556 |
| 5,507,637 | 4/1996 | Schad et al. | 425/549 |
| 5,558,824 | 9/1996 | Shah et al. | 425/130 |
| 5,582,851 | 12/1996 | Hofstetter et al. | 425/562 |
| 5,607,640 | 3/1997 | Hendry | 264/572 |
| 5,824,261 | 10/1998 | Berdan | 425/130 |

FOREIGN PATENT DOCUMENTS

| | | | |
|---|---|---|---|
| 55-14218 | 1/1980 | Japan | 425/444 |
| 7-124985 | 5/1995 | Japan | 264/572 |

*Primary Examiner*—Robert Davis
*Attorney, Agent, or Firm*—Brooks & Kushman P.C.

[57] ABSTRACT

A mold for use in a gas-assisted injection molding system having a nozzle includes a runner shut-off subsystem which prevents pressurized gas from flowing through the runner and into the nozzle. A pair of pins are preferably mounted on a plate to move therewith between extended and retracted positions of the plate. The pins are slidably fit within one mold half of the mold to move within the runner between extended gas-blocking positions to block the flow of pressurized gas through the runner and into the nozzle and retracted positions to allow the flow of molten plastic from the nozzle, through the runner, through a gate, and into an article-defining cavity in a closed position of the mold. The runner shut-off subsystem includes a hydraulic cylinder for moving the plate and the pins relative to the mold half. Each of the pins has a free end portion which extends into another mold half of the mold where it is received and retained in its extended gas-blocking position. Preferably, the pins are ejector pins and the plate is an ejector plate.

12 Claims, 2 Drawing Sheets

MOLD FOR USE IN A GAS-ASSISTED INJECTION MOLDING SYSTEM AND RUNNER SHUT-OFF SUBSYSTEM FOR USE THEREIN

CROSS-REFERENCE TO RELATED APPLICATIONS

This application is related to U.S. patent applications entitled "Mold For Use In A Gas-Assisted Injection Molding System And Gas Pin Assembly For Use Therein" filed Sep. 22, 1997 and having U.S. Ser. No. 08/935,013; "Mold For Use In A Gas-Assisted Injection Molding System And Adjustable Overflow Pin Assembly Use Therein" now U.S. Pat. No. 5,869,105; "Mold For Use In A Gas-Assisted Injection Molding System And Ejector Pin Subsystem Including A Split Pin For Use Therein" and "Mold For Use In A Gas-Assisted Injection Molding System and Ejector Pin Subsystem Including A Blocking Pin Assembly For Use Therein" all filed on Apr. 14, 1998 and having U.S. Ser. Nos. 09/059,947 and 09/060,239, respectively; "Mold For Use In A Plastic Injection Molding system And Venting Pin Assembly For Use Therein" filed on Mar. 12, 1998 and having U.S. Ser. No. 09/041,333.

TECHNICAL FIELD

This invention relates to molds and runner shut-off subsystems for use therein and, in particular, to molds for use in gas-assisted injection molding systems and runner shut-off subsystems for use therein.

BACKGROUND ART

The use of pressurized gas in plastic injection molding to make hollow plastic parts is now widely used. One problem with the use of gas is that sometimes the gas flow path cannot be completely controlled and the gas will flow from the runner in the mold back through "drops" in the mold and then back into a plastic injection nozzle to contaminate the plastic in the nozzle. Gas trapped in the nozzle area tends to foam the plastic resin in that area during venting. This foamed plastic causes blemishes (i.e. splay) in the next part when injected into the mold.

U.S. Pat. No. 4,943,407 discloses both a stationary disk-shaped insert and a movable pin disposed within a sprue body to prevent such contamination.

U.S. Pat. No. 4,942,006 discloses a method and apparatus for gas-assisted injection molding in which variable pressure is applied to a piston of a valve for a nozzle causing the tip to open and close preventing a gas from entering the flow path.

U.S. Pat. No. 5,149,546 discloses a check valve for use in gas-assisted injection molding having a tapered member that seats into a corresponding tapered valve chamber for preventing reverse flow.

U.S. Pat. No. 5,080,570 discloses gas-assisted injection molding having a reciprocating shut-off pin in the non-viscous fluid flow passage of the shut-off needle for controlling fluid flow.

U.S. Pat. No. 5,232,711 discloses a method and system for gas-assisted injection molding including a sealed pin or valve having an orifice that is movable between opened and closed positions.

U.S. Pat. No. 5,507,637 discloses a hot runner sliding nozzle-manifold assembly employing a clamping ring to apply a clamping force to the nozzle housing for preventing leakage of molten plastic.

U.S. Pat. No. 4,740,150 discloses a gas-assisted injection molded apparatus having a mold valve for venting gas pressure and U.S. Pat. Nos. 5,582,851 and 4,682,943 disclose multi-plate injection molding per se.

SUMMARY OF THE INVENTION

An object of the present invention is to provide a mold for use in a gas-assisted injection molding system and runner shut-off subsystem for use therein wherein the subsystem includes at least one pin slidably fit within the mold to move in the runner to prevent pressurized gas from flowing through the runner and into a nozzle. The at least one pin prevents the gas from contaminating molten resin in the nozzle. This is a practical design which is not only relatively inexpensive but also is simple in operation and for servicing.

In carrying out the above object and other objects of the present invention, a mold for use in a gas-assisted injection molding system including a nozzle for injecting molten plastic into the mold is provided. The mold includes a first mold half and a second mold half. The first and second mold halves are movable relative to each other between an open position and a closed position. The first and second mold halves define an article-defining cavity, a runner, and a gate for flow coupling the runner to the article-defining cavity. The mold also includes a runner shut-off subsystem having at least one pin slidably fit within the second mold half to move relative to the second mold half in the runner between an extended gas-blocking position to prevent pressurized gas from flowing through the runner and into the nozzle and a retracted position to allow the flow of molten plastic from the nozzle, through the runner, through the gate, and into the article-defining cavity in the closed position of the mold. The subsystem also includes an actuator coupled to the at least one pin for moving the at least one pin relative to the second mold half between its extended gas-blocking position and its retracted position.

Preferably, the subsystem includes a pair of pins and the subsystem includes a plate on which the pins are mounted to move therewith. The actuator includes a cylinder which is coupled to the plate for moving the plate relative to the second mold half between extended and retracted positions thereof. Also, preferably, the cylinder is a hydraulic cylinder.

Also, preferably, each of the pins has a free end portion which extends into the first mold half where it is received and retained in its extended gas-blocking position in the closed position of the mold.

Still, preferably, each of the pins is an ejector pin and the plate is an ejector plate.

Still further in carrying out the above object and other objects of the present invention, in a mold having a first mold half and a second mold half wherein the first and second mold halves move relative to each other between an open position and a closed position and wherein the first and second mold halves defined an article-defining cavity, a runner, and a gate for flow coupling the runner to the article-defining cavity, a runner shut-off subsystem is provided. The runner shut-off subsystem includes at least one pin slidably fit within the second mold half to move relative to the second mold half in the runner between an extended gas-blocking position to prevent pressurized gas from flowing through the runner and into a nozzle which injects molten plastic into the mold and a retracted position to allow the flow of molten plastic from the nozzle, through the runner, through the gate, and into the article-defining cavity in the closed position of the mold. The subsystem further includes an actuator coupled to the at least one pin for moving the at least one pin relative to the second mold half between its extended gas-blocking position and its retracted position.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
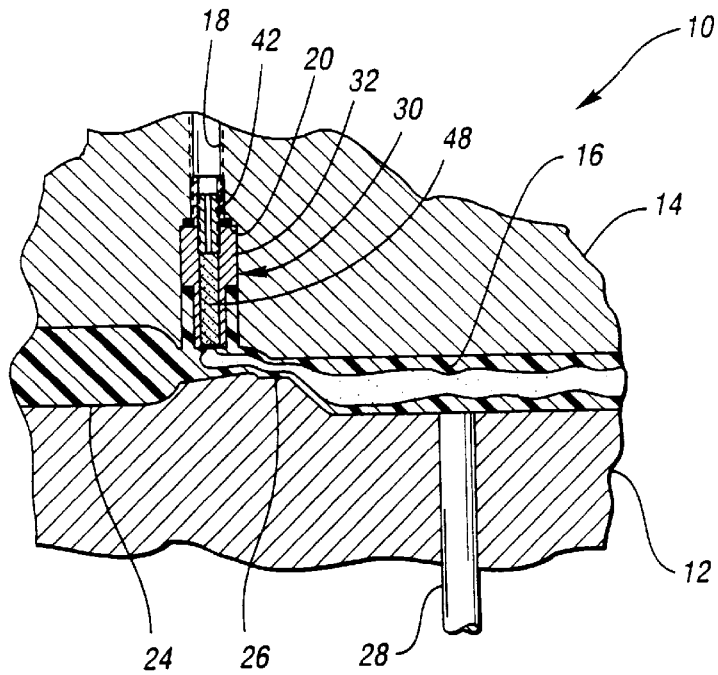
FIG. 1 is a view, partially broken away and in cross-section, of a mold showing a gas path through a shot of plastic resin.

Referring now to the drawing Figures, there is illustrated in FIG. 1 a mold, generally indicated at 10, for use in a gas-assisted injection molding system including a nozzle (not shown) for injecting plastic into the mold 10. The mold 10 includes a first mold half 12 and a second mold half 14. The first and second mold halves 12 and 14, respectively, are movable relative to each other between an open position and a closed position as shown in FIG. 1, wherein the first and second mold halves 12 and 14, respectively, define an article-defining cavity 16.

The second mold half 14 includes a gas passageway 18 which extends from an exterior surface (not shown) of the second mold half 14 to an inner interior surface 20 of the second mold half 14 in fluid communication with the article-defining cavity 16.

Figure 2:
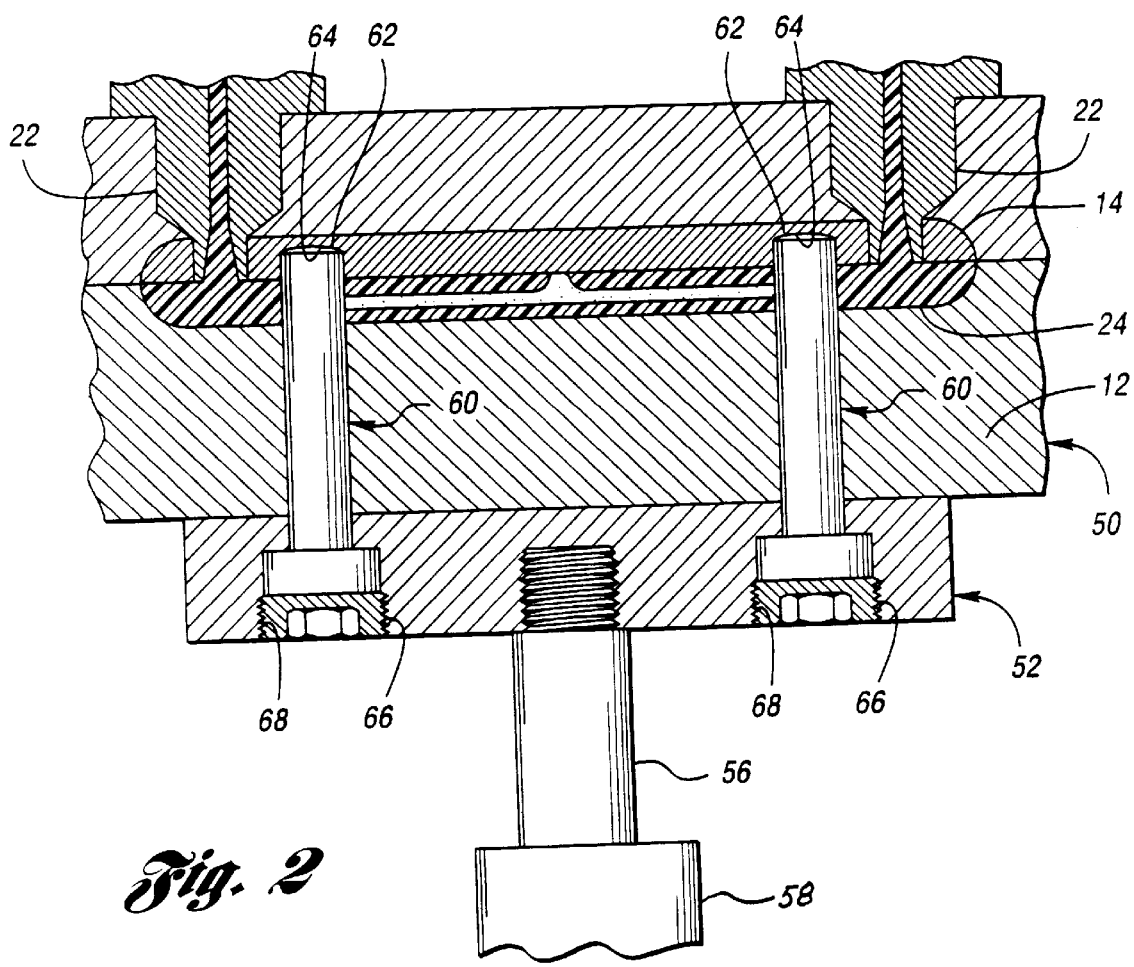
FIG. 2 is a view, partially broken away and in cross-section, of the mold of FIG. 1 including a runner shut-off subsystem both of which are constructed in accordance with the present invention.

Referring now to FIGS. 1 and 2, the second or stationary mold half 14 includes a pair of "hot drops" 22 for communicating thermoplastic material from the nozzle to a runner 24 which, in turn, communicates with the article-defining cavity 16 via a gate 26. A thermoplastic flow path within the mold 10 to the cavity 16 is defined by the drops 22, the runner 24 and the gate 26. Alternatively, a center drop may be used instead of the two drops 22.

An ejector pin 28 extends through the first or movable mold half 12 and is connected to an ejector plate (not shown). The ejector plate is supported to move relative to the first mold half 12 from a retracted position to an extended position to eject a completed part from the article-defining cavity 16.

The mold 10 also includes a gas pin assembly, generally indicated at 30. The gas pin assembly 30 includes a one-piece housing 32. A base portion of the housing 32 is threadedly secured to the second mold half 14 at the interior surface 20 of the second mold half 14 so that the gas pin assembly 30 can be readily removed from the second mold half 14 in the open position of the mold 10. A rubber O-ring is typically provided about the base portion of the housing 32 to seal the housing 32 within the second mold half 14.

Preferably, the housing 32 also includes a hexagonal head portion so that the assembly 30 can be readily removed from the second mold half 14 in the open position of the mold 10 by a conventional tool (not shown).

The housing 32 includes an elongated aperture formed therein in communication with and aligned with the gas passageway 18 to permit the flow of gas therethrough.

The base portion of the housing 32 is also internally threaded to threadedly secure therein a holding device in the form of a set screw 42 which has a gas hole formed completely therethrough to permit the flow of gas therethrough.

The gas pin assembly 30 also includes a porous insert 48 comprising a sintered material such as aluminum, copper, nickel, steel, bronze, porcelain, and brass which permits the flow of gas therethrough but prevents the passage of molten plastic therethrough. The insert 48 is held in position within the aperture by the set screw 42 at one end thereof and by flanges of the head portion at the opposite end thereof.

The sintered material is preferably a bronze sintered material and can filter out foreign particles down to 20 microns. However, the micron size can be varied depending on the type of plastic utilized in the molding process.

Further details of the gas pin assembly 30 can be found within the above-noted patent application entitled "Mold For Use In A Gas-Assisted Injection Molding System And Gas Pin Assembly For Use Therein". While the gas pin assembly 30 is illustrated as the particular mechanism for injecting pressurized gas into the article-defining cavity 16, other mechanism can be utilized to inject pressurized gas into the article-defining cavity 16 as illustrated and described in the prior art patents noted in the "Background Art" portion of this application.

The mold 10 also includes a runner shut-off subsystem, generally indicated at 50 in FIG. 2. The subsystem 50 generally includes an ejector plate, generally indicated at 52, which is threadedly secured to a shaft 56 of an actuator in the form of a hydraulic cylinder 58 which moves the plate 52 relative to the mold half 12.

The runner shut-off subsystem 50 also includes a pair of ejector pins 60 which are mounted on the plate 52 to move therewith. The pins 60 are slidably fit within the mold half 12 to move relative to the mold half 12 to extended gas-blocking positions defined by recesses 64 formed in the mold half 14. Free end portions 62 of the pins 60 are received and retained in the recesses 64. In their gas-blocking positions, the pins 60 block the flow of pressurized gas through the runner 52 so the pressurized gas cannot enter the drops 22 and go back into the plastic within the nozzle of the system. If a center drop is used, the pins 60 are positioned on opposite sides of the center drop to shut off the runner 24.

The pins 60 extend through the plate 52 and are removably secured thereto by set screws 66 which, in turn, are threadedly secured within threaded holes 68 formed in the plate 52. The pins 60 and the plate 52 are retractable within the mold half 12 to a retracted position by the hydraulic cylinder 58.

In the retracted position of the plate 52 relative to the mold half 12, molten plastic is allowed to flow from the nozzle, through the drops 22, through the runner 24, through the gate 26 and into the article-defining cavity 16. The free end portions 62 of the pins 60 have end surfaces or faces which partially defines the runner 24 in the retracted position of the plate 52.

Figure 3:
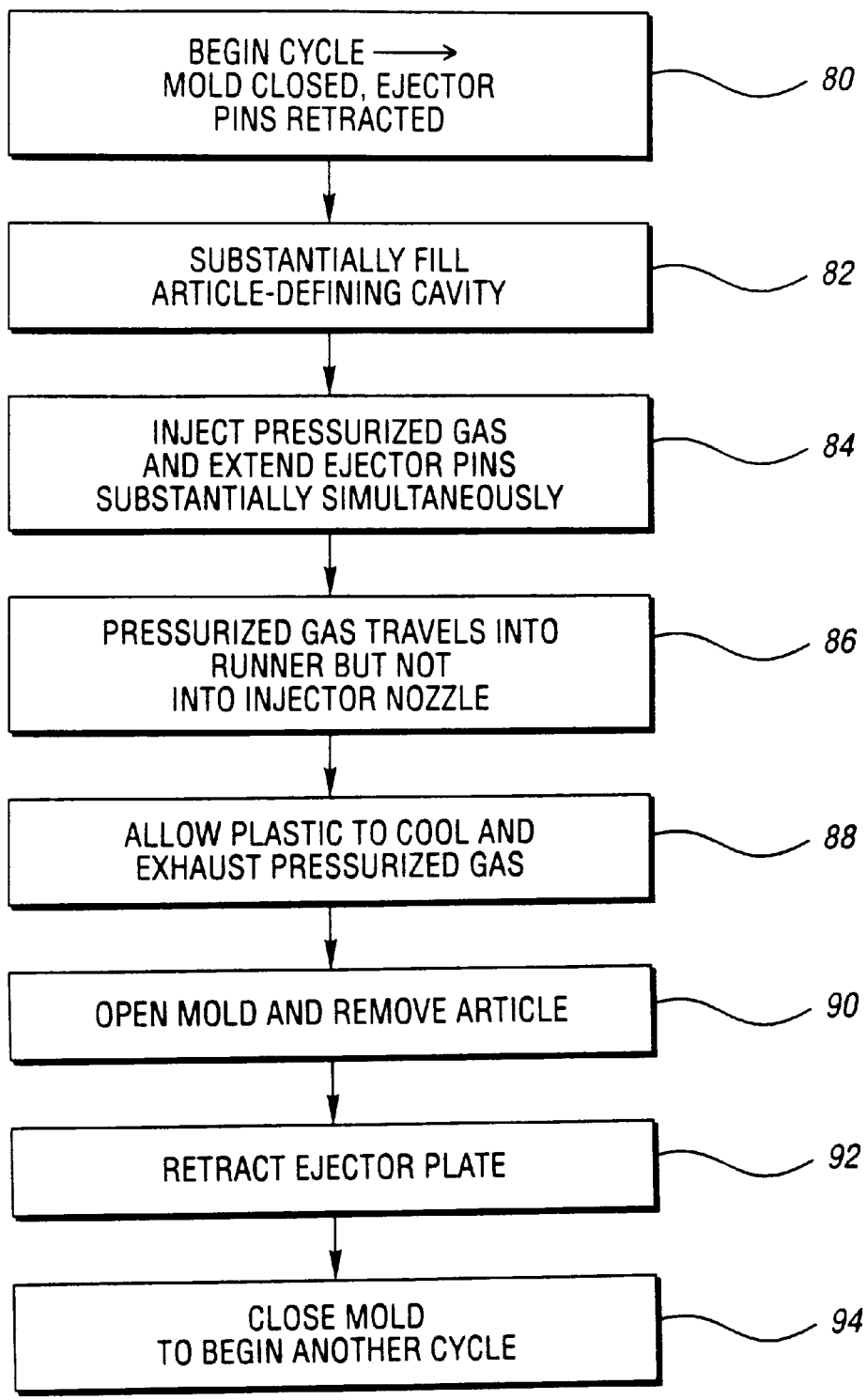
FIG. 3 is a block diagram flow chart illustrating the various steps utilized in a gas-assisted injection molding system which utilizes the mold and runner shut-off subsystem of the present invention.

Referring now to FIG. 3, there is illustrated in block diagram flow-chart form various process steps implemented by a gas-assisted injection molding system including the mold 10 of the present invention.

At block 80, an injection molding cycle begins wherein the mold 10 is closed and the ejector pins 60 are retracted within the runner 24 so as not to block plastic flow within the runner 24.

At block 82, the article-defining cavity 16 is substantially filled with plastic which has flowed from the nozzle, through the drops 22, the runner 24 and the gate 26.

At block 84, pressurized gas is injected into the article-defining cavity 16 and the ejector pins 60 are extended substantially simultaneously with the injection of pressurized gas to prevent the gas from traveling through the runner 24, into the drops 22 and then into the nozzle.

At block 86, pressurized gas which might travel into the runner 24 does not reach the nozzle. The ejector pins 60 which are connected to an ejector plate 52 shut off the runner 24 so that gas which might enter the runner 24 is not allowed to flow into the drops 22 and back into the nozzle.

At block 88, the molten plastic within the article-defining cavity 16, the runner 24 and the drops 22 is allowed to cool and the pressurized gas is exhausted from the article-defining cavity 16.

At block 90, the mold 10 is opened and the resulting hollow plastic article is removed.

At block 92, the ejector plate 52 is retracted by the cylinder 58 relative to the mold half 12 to thereby retract the pins 60.

At block 94, the mold 10 is closed to await the beginning of another injection molding cycle with the pins 60 retracted to allow plastic to flow unimpeded from the nozzle to the article-defining cavity 16.

While the best mode for carrying out the invention has been described in detail, those familiar with the art to which this invention relates will recognize various alternative designs and embodiments for practicing the invention as defined by the following claims.

What is claimed is:

1. A mold for use in a gas-assisted injection molding system including a nozzle for injecting molten plastic into the mold, the mold comprising:

a first mold half;

a second mold half, the first and second mold halves being movable relative to each other between an open position and a closed position, wherein the first and second mold halves define an article-defining cavity, a runner, and a gate for flow coupling the runner to the article-defining cavity; and a runner shut-off subsystem including:

a plate, a pair of pins mounted on the plate to move therewith and slidably fit within the second mold half to move relative to the second mold half within the runner between extended gas-blocking positions to prevent pressurized gas from flowing through the runner and into the nozzle and retracted positions to allow the flow of molten plastic from the nozzle, through the runner, through the gate, and into the article-defining cavity in the closed position of the mold; and an actuator coupled to the plate for moving the plate and the pins relative to the second mold half between the extended gas-blocking positions and the retracted positions.

2. The mold as claimed in claim 1 wherein the actuator includes a cylinder for moving the plate relative to the second mold half.

3. The mold as claimed in claim 2 wherein the cylinder is a hydraulic cylinder.

4. The mold as claimed in claim 1 wherein the plate is an ejector plate.

5. The mold as claimed in claim 1 wherein each of the pins has a free end portion and wherein each free end portion is received and retained within the first mold half in the extended gas-blocking positions of the pins in the closed position of the mold.

6. The mold as claimed in claim 4 wherein the pins are ejector pins.

7. In a mold having a first mold half and a second mold half, the first and second mold halves being movable relative to each other between an open position and a closed position and wherein the first and second mold halves define an article-defining cavity, a runner, and a gate for flow coupling the runner to the article-defining cavity, a runner shut-off subsystem comprising:

a plate;

a pair of pins mounted on the plate to move therewith and slidably fit within the second mold half to move relative to the second mold half within the runner between extended gas-blocking positions to prevent pressurized gas from flowing through the runner and into a nozzle which injects molten plastic into the mold and retracted positions to allow the flow of molten plastic from the nozzle, through the runner, through the gate and into the article-defining cavity in the closed position of the mold; and an actuator coupled to the plate for moving the plate and the pins relative to the second mold half between the extended gas-blocking positions and the retracted positions.

8. The runner shut-off subsystem of claim 7 wherein the actuator includes a cylinder for moving the plate relative to the second mold half.

9. The runner shut-off subsystem of claim 8 wherein the cylinder is a hydraulic cylinder.

10. The runner shut-off subsystem of claim 7 wherein the plate is an ejector plate.

11. The runner shut-off subsystem of claim 7 wherein each of the pins has a free end portion which is received and retained with the first mold half in the extended gas-blocking positions in the closed position of the mold.

12. The runner shut-off subsystem of claim 10 wherein the pins are ejector pins.

* * * * *